United States Patent
Eldred et al.

(10) Patent No.: US 7,667,863 B1
(45) Date of Patent: Feb. 23, 2010

(54) METHOD FOR MODIFICATION OF PUBLICATION COVERS

(76) Inventors: John H. Eldred, 8848 Oak Valley Rd., Holland, OH (US) 43528; Jeffery M. Jankowski, 2915 Matthew Cir., Monclova, OH (US) 43542

( * ) Notice: Subject to any disclaimer, the term of this patent is extended or adjusted under 35 U.S.C. 154(b) by 702 days.

(21) Appl. No.: 11/259,915

(22) Filed: Oct. 27, 2005

(51) Int. Cl.
*G06F 15/00* (2006.01)
*G06F 3/12* (2006.01)
*G06K 1/00* (2006.01)

(52) U.S. Cl. .................................. 358/1.13; 358/1.15
(58) Field of Classification Search ............... 715/243, 715/255; 358/540, 1.1, 1.15, 1.13, 1.14, 358/1.18, 3.26
See application file for complete search history.

(56) References Cited

U.S. PATENT DOCUMENTS

| | | | |
|---|---|---|---|
| 5,193,056 A | | 3/1993 | Boes |
| 5,782,598 A | * | 7/1998 | Salzberger ............... 412/4 |
| 6,367,623 B1 | * | 4/2002 | Tully et al. .............. 206/232 |
| 6,882,441 B1 | * | 4/2005 | Faust et al. ............. 358/1.18 |
| 6,910,843 B2 | * | 6/2005 | Saw et al. .................. 412/19 |
| 7,047,411 B1 | * | 5/2006 | DeMello et al. ......... 713/176 |
| 2002/0073121 A1 | * | 6/2002 | Sano et al. ............... 707/517 |
| 2004/0108710 A1 | * | 6/2004 | Hengsbach ................. 281/29 |
| 2004/0234097 A1 | * | 11/2004 | Verhoeven et al. ...... 382/100 |
| 2005/0044476 A1 | * | 2/2005 | Bursten ................... 715/500 |
| 2005/0146745 A1 | * | 7/2005 | Umehara ................ 358/1.15 |
| 2005/0167487 A1 | * | 8/2005 | Conlon et al. .......... 235/380 |

OTHER PUBLICATIONS

Adobe PageMaker 7.0 Classroom in a Book, 2002, Adobe Systems Incorporated.*

* cited by examiner

*Primary Examiner*—Douglas Q Tran
(74) *Attorney, Agent, or Firm*—MacMillan, Sobanski & Todd, LLC

(57) ABSTRACT

A method for preparing a modified cover for a publication that includes scanning the original cover and modifying the scanned cover to include desired indicia. The modified cover is then printed and installed upon the original publication. Alternately, the publication may received electronically and the file containing the cover modified and replaced in the publication. The publication with the modified file is then distributed electronically.

20 Claims, 16 Drawing Sheets

| Library | Invoice | Title | Qty | Callnum | Ord date | Del date | Po | Stat | Format |
|---|---|---|---|---|---|---|---|---|---|
| 33130 | 834812 | MIRROR CRACK'D (AGATHA CHRISTIE'S) [DVD] | 1 | MIRRORCR DVD | 11/04/2003 | 07/13/2004 | LVIDF | N | D |
| 33130 | 813212 | MIRROR CRACK'D (AGATHA CHRISTIE'S) [DVD] | 1 | MIRRORCR DVD | 11/03/2003 | 06/02/2004 | MBDVD | N | D |
| 33130 | 599312 | MIRROR CRACK'D (AGATHA CHRISTIE'S) [DVD] | 4 | MIRRORCR DVD | 12/26/2002 | 03/20/2003 | VD1002A | N | D |
| 33130 | 642758 | GET OUT YOUR HANKERCHIEFS (FRENCH) [DVD] | 1 | GETOUTYO DVD | 12/30/2002 | 06/26/2003 | NA-VDMINU | N | D |
| 33130 | 615926 | GET OUT YOUR HANKERCHIEFS (FRENCH) [DVD] | 1 | | 04/02/2003 | 05/14/2003 | TAVIDA | N | D |
| 33130 | 834812 | STUNT MAN, THE [DVD] | 2 | STUNTMAN DVD | 11/04/2003 | 07/13/2004 | LVIDF | N | D |
| 33130 | 813212 | STUNT MAN, THE [DVD] | 2 | STUNTMAN DVD | 11/03/2003 | 06/02/2004 | MBDVD | N | D |
| 33130 | 571111 | STUNT MAN, THE [DVD] | 4 | STUNTMAN DVD | 10/29/2002 | 01/08/2003 | VDD802A | N | D |
| 33130 | 637593 | PELLE THE CONQUEROR (DANISH) [DVD] | 1 | PELLEFRO DVD | 05/22/2003 | 07/02/2003 | TAVIDA | N | D |
| 33130 | 794225 | UN FLIC <FRENCH> <DVD> | 2 | DIRTYMON DVD Fr | 03/08/2004 | 04/28/2004 | DVD1203M | N | D |
| 33130 | 806256 | KIND HEARTS AND CORONETS [DVD] | 1 | KINDHEAR DVD | 11/04/2003 | 05/21/2004 | LVIDF | N | D |
| 33130 | 813212 | KIND HEARTS AND CORONETS [DVD] | 1 | KINDHEAR DVD | 11/03/2003 | 06/02/2004 | MBDVD | N | D |
| 33130 | 627025 | KIND HEARTS AND CORONETS [DVD] | 5 | KINDHEAR DVD | 02/13/2003 | 05/14/2003 | VD1202A | N | D |
| 33130 | 806256 | LADYKILLERS, THE [DVD] | 1 | LADYKILL DVD | 11/04/2003 | 05/21/2004 | ILVIDF | N | D |
| 33130 | 813212 | LADYKILLERS, THE [DVD] | 1 | LADYKILL DVD | 11/03/2003 | 06/02/2004 | MBDVD | N | D |
| 33130 | 627025 | LADYKILLERS, THE [DVD] | 4 | LADYKILL DVD | 02/13/2003 | 05/14/2003 | VD1202A | N | D |
| 33130 | 617999 | THOMAS: RACES RESCUES & RUNAWAYS [DVD] | 12 | THOMASTH DVD J | 01/22/2003 | 04/30/2003 | JMVID1102A | N | D |
| 33130 | 650194 | THOMAS: RACES RESCUES & RUNAWAYS [DVD] | 13 | THOMASTH DVD J | 03/11/2003 | 07/17/2003 | JMVID1102A | N | D |
| 33130 | 617999 | THOMAS: CRANKY BUGS [DVD] | 12 | THOMASTH DVD J | 01/22/2003 | 04/30/2003 | JMVID1102 | N | D |
| 33130 | 673906 | THOMAS: CRANKY BUGS [DVD] | 9 | | 03/11/2003 | 09/06/2003 | JMVID1102A | N | D |
| 33130 | 617999 | THOMAS: SALTY'S SECRET [DVD] | 7 | THOMASTH DVD J | 01/22/2003 | 04/30/2003 | JMVID1102A | N | D |
| 33130 | 663573 | THOMAS: SALTY'S SECRET [DVD] | 7 | THOMASTH DVD J | 03/11/2003 | 07/11/2003 | JMVID1102A | N | D |
| 33130 | 617999 | THOMAS: CHRISTMAS WONDERLAND [DVD] | 8 | THOMASCH DVD J | 01/22/2003 | 04/30/2003 | JMVID1102 | N | D |
| 33130 | 673906 | THOMAS: CHRISTMAS WONDERLAND [DVD] | 11 | | 03/11/2003 | 09/06/2003 | JMVID1102A | N | D |
| 33130 | 617999 | THOMAS: SPILLS, CHILLS & OTHER THOMAS THRILLS [DVD] | 13 | SPILLSAN DVD J | 01/22/2003 | 04/30/2003 | JMVID1102 | N | D |
| 33130 | 650194 | THOMAS: SPILLS, CHILLS & OTHER THOMAS THRILLS [DVD] | 11 | THOMASSP DVD Y | 03/11/2003 | 07/17/2003 | JMVID1102A | N | D |
| 33130 | 806255 | CRUNCH: CANDLELIGHT YOGA [DVD] | 1 | 613.7046 CAND DVD | 11/04/2003 | 05/21/2004 | ILVIDNF | N | D |
| 33130 | 813212 | CRUNCH: CANDLELIGHT YOGA [DVD] | 1 | 613.7046 CAND DVD | 11/03/2003 | 06/02/2004 | MBDVD | N | D |
| 33130 | 633202 | CRUNCH: CANDLELIGHT YOGA [DVD] | 4 | 613.7046 CAND DVD | 04/14/2003 | 06/04/2003 | VD0203A | N | D |
| 33130 | 673931 | THOMAS: PERCY'S CHOCOLATE CRUNCH [DVD] | 5 | PERCYSCH DVD J | 05/22/2003 | 07/18/2003 | JMID03 | N | D |
| 33130 | 854959 | THOMAS: BEST OF GORDON <DVD> | 9 | BESTOFGO DVD J | 06/02/2004 | 08/17/2004 | JVID0304D | N | D |
| 33130 | 842069 | THOMAS: NEW FRIENDS FOR THOMAS <DVD> | 11 | THOMASAN DVD J | 06/02/2004 | 07/22/2004 | JVID0304D | N | D |

FIG. 5

| Title | Line1 | Line2 | Line3 | Line4 |
|---|---|---|---|---|
| ACAPULCO A GO-GO <SPANISH> <DVD> | DVD | ACAPULC | | |
| FRAZETTA: PAINTING WITH FIRE <CE> <2 D> <DVD> | DVD | FRAZETT | | |
| GARFIELD TRAVEL ADVENTURES <DVD> | DVD J | GARFIEL | | |
| PARAISO B [PARADISE B] <SPANISH> <DVD> | DVD | PARAISO | | |
| ACAPULCO A GO-GO <SPANISH> <DVD> | DVD | ACAPULC | | |
| FRAZETTA: PAINTING WITH FIRE <CE> <2 D> <DVD> | DVD | FRAZETT | | |
| GARFIELD TRAVEL ADVENTURES <DVD> | DVD J | GARFIEL | | |
| PARAISO B [PARADISE B] <SPANISH> <DVD> | DVD | PARAISO | | |
| ACAPULCO A GO-GO <SPANISH> <DVD> | DVD | ACAPULC | | |
| FRAZETTA: PAINTING WITH FIRE <CE> <2 D> <DVD> | DVD | FRAZETT | | |
| GARFIELD TRAVEL ADVENTURES <DVD> | DVD J | GARFIEL | | |
| PARAISO B [PARADISE B] <SPANISH> <DVD> | DVD | PARAISO | | |
| KING'S RANSOM [PLATINUM SERIES] <WS> <DVD> | DVD | KING'S | | |
| FDR: A PRESIDENCY REVEALED <2 D> <DVD> | | | | |
| RUGRATS GROWN UP! DUDE, WHERE'S MY HORSE? <DV | | | | |
| JULIUS CAESAR'S ROME <2 D> <DVD> | | | | |
| UPSIDE OF ANGER, THE <WS> <DVD> | DVD | XXX ST | | |
| XXX STATE OF THE UNION <SE> <DVD> | DVD | XXX ST | | |
| XXX STATE OF THE UNION <SE> <DVD> | | | | |
| UPSIDE OF ANGER, THE <WS> <DVD> | CHICAGO PUBLIC LIBRARY | AUSTIN-IRVING BRANCH | 6100 W. IRVING PARK ROAD | CHICAGO IL 60634 |
| UPSIDE OF ANGER, THE <WS> <DVD> | CHICAGO PUBLIC LIBRARY | ALBANY PARK BRANCH | 5150 N. KIMBALL AVENUE | CHICAGO IL 60625 |
| UPSIDE OF ANGER, THE <WS> <DVD> | CHICAGO PUBLIC LIBRARY | ARCHER HEIGHTS BRANCH | 5055 S. ARCHER AVENUE | CHICAGO IL 60632 |
| UPSIDE OF ANGER, THE <WS> <DVD> | CHICAGO PUBLIC LIBRARY | AVALON BRANCH | 400 S. STATE ST. ROOM 1DS-14 | CHICAGO IL 60605 |
| UPSIDE OF ANGER, THE <WS> <DVD> | CHICAGO PUBLIC LIBRARY | BEVERLY BRANCH | 2121 W. 95TH STREET | CHICAGO IL 60643 |
| UPSIDE OF ANGER, THE <WS> <DVD> | CHICAGO PUBLIC LIBRARY | BLACKSTONE BRANCH | 4904 S. LAKE PARK AVENUE | CHICAGO IL 60615 |
| UPSIDE OF ANGER, THE <WS> <DVD> | CHICAGO PUBLIC LIBRARY | BRIGHTON PARK BRANCH | 4314 S. ARCHER AVENUE | CHICAGO IL 60632 |
| UPSIDE OF ANGER, THE <WS> <DVD> | CHICAGO PUBLIC LIBRARY | BRAINERD BRANCH | 1350 W. 89TH STREET | CHICAGO IL 60620 |
| UPSIDE OF ANGER, THE <WS> <DVD> | CHICAGO PUBLIC LIBRARY | BUCKTOWN-WICKER PARK BRANCH | 400 S. STATE ST ROOM 1DS-14 | CHICAGO IL 60605 |
| UPSIDE OF ANGER, THE <WS> <DVD> | CHICAGO PUBLIC LIBRARY | BUDLONG WOODS BRANCH | 5630 N. LINCOLN AVENUE | CHICAGO IL 60659 |
| UPSIDE OF ANGER, THE <WS> <DVD> | CHICAGO PUBLIC LIBRARY | CHINATOWN BRANCH | 2353 S. WENTWORTH AVENUE | CHICAGO IL 60616 |
| UPSIDE OF ANGER, THE <WS> <DVD> | CHICAGO PUBLIC LIBRARY | CLEARING BRANCH | 6423 W. 63RD PLACE | CHICAGO IL 60638 |
| UPSIDE OF ANGER, THE <WS> <DVD> | CHICAGO PUBLIC LIBRARY | CANARYVILLE BRANCH | 642 W. 43RD STREET | CHICAGO IL 60609 |
| UPSIDE OF ANGER, THE <WS> <DVD> | CHICAGO PUBLIC LIBRARY | BESSIE COLEMAN BRANCH | 731 E. 63RD STREET | CHICAGO IL 60637 |

METHOD FOR MODIFICATION OF PUBLICATION COVERS

CROSS-REFERENCE TO RELATED APPLICATIONS

Not Applicable

BACKGROUND OF THE INVENTION

This invention relates in general to cover art work for published materials and in particular to a method to modify the cover art work to display required indicia.

Both public and private libraries need to mark their circulating materials with indicia to include classification and identification information, such as, for example, the library branch or location and catalog information for locating the material within the library. In the past, such information has been individually placed upon labels that are then affixed to an accessible place upon the circulating materials. Typically, the labels are placed upon the dust covers of books, the outsides of VCR cases and upon the artwork contained within CD jewel boxes or DVD cases.

A typical known process for applying the desired indicia to circulating materials is illustrated as a flow chart in FIG. 1. The process is entered through block 10 and proceeds to functional block 12 where a publication, which may consist of multiple copies, or titles, of the publication is received by the institution. The publication may be in a printed medium, such as a book or periodical, an audio medium, such as a CD or audio tape, a visual medium, such as a painting, picture or map or audio-visual medium such as a video tape or DVD. The dust cover, or jacket, which typically contains art work, the title and author, is removed from a hard cover book in functional block 14. Similarly, the cover art work is removed from CD jewel boxes or DVD cases. One or more labels with the specific institutional indicia, such as a call number and name of the institution, are prepared in functional block 16 for each of the titles being processed. The preparation may consist of typing the information onto labels or perhaps preparing the labels by hand or with a personal computer. The labels are affixed to the dust cover or cover art work in functional block 18. The modified dust cover or cover art work is then replaced upon the title in functional block 20. For periodicals that do not have a separate dust cover, the labels are applied directly to the periodical cover. Finally, each of the titles is placed into circulation by the institution in functional block 22 and the process is exited through block 24.

The preparation of such individual labels for each title is labor intensive and hence both time consuming and expensive. Also, because each label must be individually prepared, there is a chance that erroneous information may be applied to the materials. For example, a mistake in the catalog number applied to a title could result in the title being misplaced within the library and thus cause difficulty when it is desired to retrieve the miss-labeled item. Accordingly, it would be desirable to provide a more efficient method of affixing the information upon the circulating materials.

BRIEF SUMMARY OF THE INVENTION

This invention relates to a method to modify dust covers and cover art work for published materials to display required indicia.

The present invention contemplates a method for preparing a cover for a publication title that includes scanning the original title cover and storing an image of the cover art work in a memory device. The stored image is then modified to display desired indicia. Finally, the modified image is printed as a new cover and the new cover is installed upon the original publication title.

The invention also contemplates an alternate method for publications that are in a digital format that may be electronically transmitted. The alternate method consists of receiving a digital record of the publication and extracting files from the record for modification to include desired indicia. The modified files are replaced in the record and the record electronically distributed to the final user.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a computer monitor screen display of a temporary data table created by the method illustrated in FIG. 3.

FIG. 6 is a computer monitor screen display of typical textual data fields generated by the method illustrated in FIG. 3.

DETAILED DESCRIPTION OF THE PREFERRED EMBODIMENT

Figure 1:
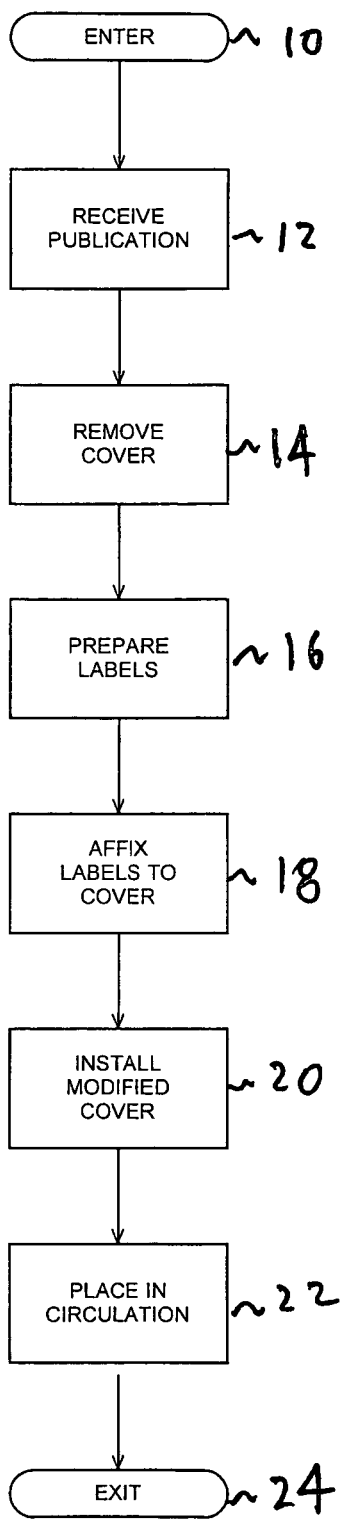
FIG. 1 is a flow chart for a known method for marking circulating materials.
Figure 2:
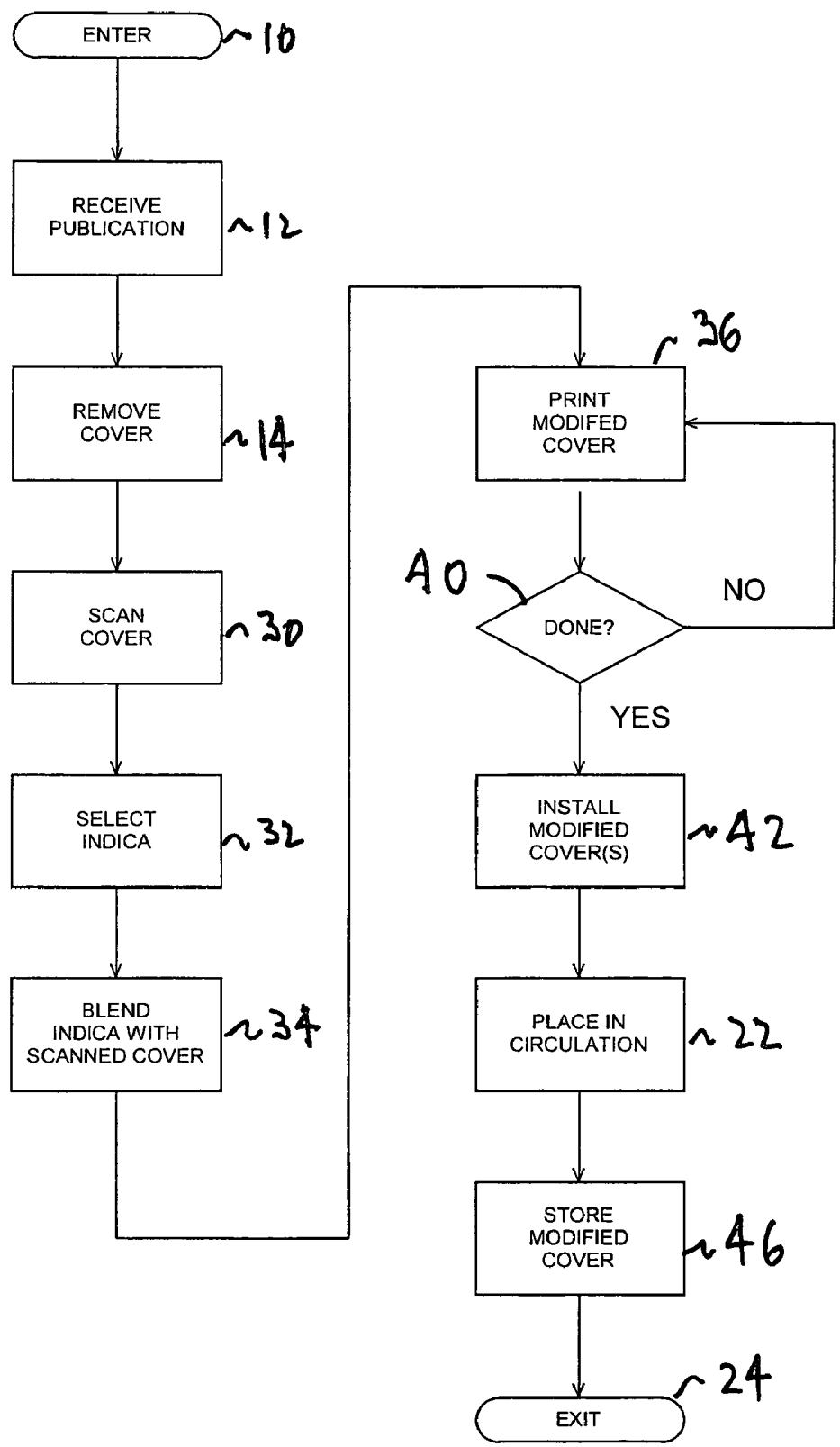
FIG. 2 is a flow chart for a method for marking circulating materials that is accordance with the present invention.

Referring now to the drawings, there is illustrated in FIG. 2 a flow chart for a method for marking circulating materials that is accordance with the present invention. In the preferred embodiment, the method is under the overall control of a computer. It also is contemplated that implementation of the method may utilize more more than one computer. When multiple computers are used, they would be interconnected by a network to allow sharing of data between the individual units. Blocks shown in FIG. 2 that are similar to blocks shown in FIG. 1 have the same numerical identifiers. Thus, the method is entered through block 10 and proceeds to functional block 12 where the publication, which may consist of multiple copies, or titles, of the publication, is received by the institution. As described above, the publication may be in any form of media, such as, for example, a hard or soft covered book, periodical, audio tape, video tape, CD, DVD, or any other circulating item is received by the institution. Continuing to functional block 14, the dust cover for each hard covered book title or the cover art work for each CD or DVD title is removed.

The dust cover or cover art work is scanned in functional block 30 to form a cover digital image. The scanned image includes both artwork and original indicia such as the publication title and author and, for CD's and DVD's, content notes. The particular indicia that are to be added to the cover are selected in functional block 32 and then, in functional block 34, the selected indicia are digitally overlaid upon, or blended with, the cover digital image to form a modified cover digital image. The invention contemplates that the indicia may be moved to any position upon the cover digital image. Additionally, individual indicia may be modified after they are overlaid upon the cover digital image. The modified cover digital image is printed in functional block 36 to provide a modified dust cover or cover art work. In the preferred embodiment, a color printer is utilized to better replicate the appearance of the original art work.

Typically, an institution such as a library, will order multiple titles, or copies, of a publication. Accordingly, the method advances to decision block 40 where it is determined whether all of the needed covers have been printed. If all of the covers have not been printed, the method transfers back to functional block 36 where another modified cover is printed. If, in decision block 40, all of the covers have been printed, the method transfers to functional block 42 where the modified covers are installed on the individual titles. The titles are then placed in circulation in functional block 22. The digital image of the modified cover that was formed in functional block 34 is stored in functional block 46 in a digital data storage device, such as a computer hard drive or server, for use if more copies of the same title are obtained in the future. The method then exits through block 24.

Regarding publications such as periodically published magazines, soft covered books and video tapes, the method described above is slightly modified in that the original cover in not removable from the individual titles. However, as described above, the original title cover art work of a magazine or soft covered book may still be scanned in functional block 30 and the scanned image combined with the selected indicia, as shown in functional block 34, to form a modified digital image of the cover. A new modified cover would then be printed in functional block 36 that would either replace, or be attached over, the original cover in functional block 42. For video tapes, the cover information, to include art work and data, is usually printed upon paper stock that is then attached to a video tape cassette storage box. Accordingly, after scanning the original art work, the invention contemplates printing the blended image upon paper stock, or other suitable material, that is cut to fit upon either the original or a replacement cassette storage box (not shown). The stock with the blended material is then attached to the cassette storage box. Because the cassette storage boxes may have different shapes as needed to hold either a single or boxed set of cassettes, the invention contemplates cutting the paper stock after printing to fit the specific storage box.

The present invention further contemplates that the method described above also may be practiced at a central service facility that would receive the publication titles, process and then distribute them with modified cover art work to the user institutions. The invention further contemplates that the central service facility also could order the specific publications for the institutions in the number of titles, or copies, that may be needed, thus providing economies of scale for modifying the covers in accordance with the requirements of the specific institution. An alternate embodiment of the method of the present invention that would be applicable to a central service facility is illustrated by the flow chart shown in FIG. 3.

The method is entered through block 50 and proceeds to functional block 52 where an order is received at the central service facility. The invention contemplates that the central facility may be part of the institution, such as the main library of a public or private library system, with the customers being departments within the library and/or branch libraries. Alternately, the central processing facility may be an independent contractor or commercial service that provides services to the contracting party, such as a clearing house for libraries that receives orders for specific publications from libraries, orders a sufficient number of titles of each publication from publishers and then modifies the individual title covers before forwarding the titles to the ordering library. Furthermore, the invention also may be practiced by an independent contractor providing services to private businesses, such as, for example, a central facility providing modified covers for DVD's being supplied to individual video rental stores as end users. The order may be for either single or multiple titles and may include a request for one or more copies of each title. Basic order information to include the ordering party and number of titles of each ordered publication is entered into a computer accessible memory in functional block 54. As described above, the order may include multiple titles of multiple publications and also may include different media, such as both hard cover books and DVD's, that is also entered in block 54.

The method then advances to decision block 56 where it is determined whether there are sufficient titles of each publication currently in the inventory of the facility. If there are insufficient titles available, the method transfers to functional block 58 and additional titles to fill the order are ordered from a vendor. Optionally, extra titles may be ordered to assure inventory for additional orders of a particular title (not shown). This option would be particularly useful for popular titles. The method then holds until the ordered titles are received and placed in inventory in functional block 60. Once the title inventory is built to a sufficient level to support the order, the method advances to decision block 62. Returning to decision block 56, if it is determined that there are a sufficient number of titles available in inventory to fill the order, the method transfers directly to decision block 62. Optionally, replacement titles may be ordered at this point to replenish the inventory (not shown).

Figure 4:
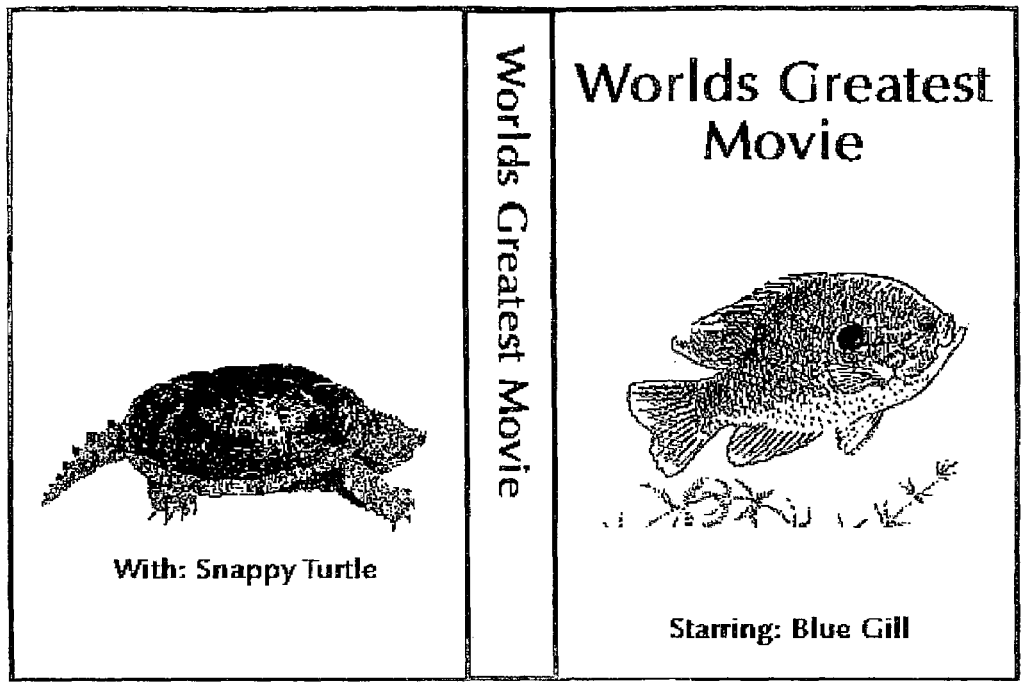
FIG. 4 is a computer monitor screen display of an image of a typical DVD cover art work that is scanned during the method shown in FIG. 3.

In decision block 62, the method determines whether the art work for each of the titles in the order is already presently stored in digital format. If the art work for any of the titles is not available, the method transfers to functional block 64 where the cover art work is scanned into digital format with conventionally available scanning equipment and supporting software. A scanned image of typical DVD cover artwork is shown in FIG. 4. Similar images would be scanned and stored for other publications in the order. The method then advances to decision block 66. Returning to decision block 62, if it is determined that a scanned image of the cover art work for each of the publications in the order is available in storage, the method transfers to directly to decision block 66.

Figure 3A:
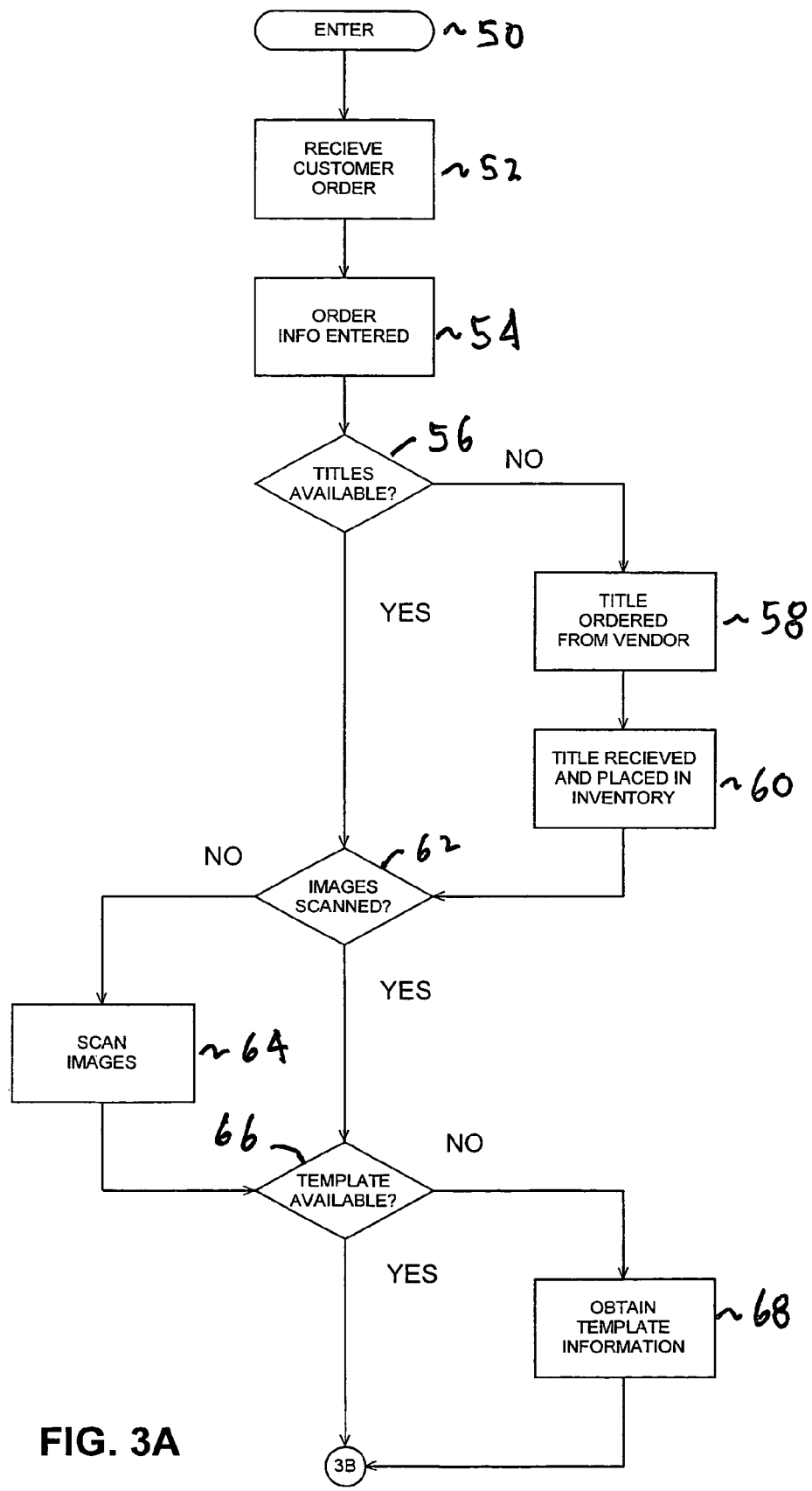
FIG. 3 is an expanded flow chart for the method shown in FIG. 2.
Figure 3B:
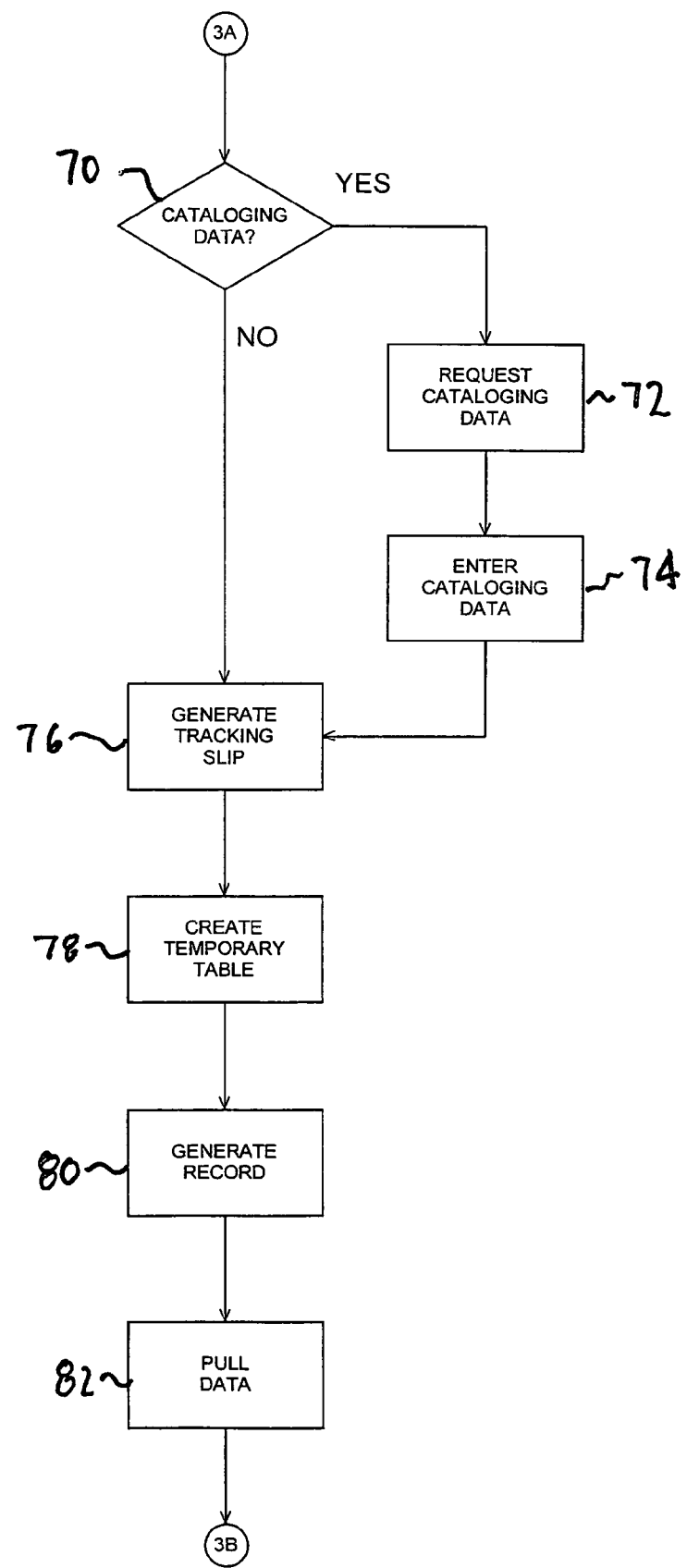

The method contemplates that the central service facility would have repeat customers and would have an established general template for each type of publication medium, that may be ordered by the particular customer. Thus, for example, a book dust cover template would be stored in a digital data storage device, or memory, that would be accessible by the controlling computer. Additionally, book cover templates would be stored for different standard book sizes. For a small operation, the digital data storage device may be included within the computer as internal memory, or, for a large operation, the digital data storage device may be external to the computer, but accessible to the computer. However, either type of memory device will be referred to in the following description as a computer accessible memory. Similarly, a cover art work template also would be stored in the memory for DVD's and other conventional mediums used for publications. Accordingly, in decision block 66, the computer accessible memory is checked for a stored template for the specific customer and the type of ordered material. If no stored template is available, the method transfers to functional block 68 where template information is obtained from the customer. Such customer template information may include, for a library example, general data such as the name and address of the branch, the duration of the loan period, telephone number and/or web site of the library, barcodes, and other similar indicia. The template also may include layout data such as the location of information items upon the cover. The customer template information is received and stored for future use in the computer accessible memory. An example of typical stored template information is shown in FIG. 5. In FIG. 5, each row corresponds to a title ordered for a particular location, such as, for example, a branch library. The first column lists the ordering party, such as the library system shown in FIG. 5. The second column shows the breakdown of the order between the individual sub-entities, such as branch libraries while the third column lists the publication title of the material and fourth column lists the number of titles for each of the sub-entities. The remaining columns are self explanatory. It will be appreciated, however, that the entries shown in FIG. 5 are meant to be exemplary and that actual data amount and entries utilized may vary from what is shown in the figure. The method then continues to decision block 70, which is shown in FIG. 3B. Returning to decision block 66, if it is determined that a stored template is available for the particular publication, the method transfers directly to decision block 70.

In decision block 70, the method checks to determine whether the template requires classification indicia for the publication, such as, for example, a Dewey Decimal System number and/or Machine-Readable Cataloging (MARC) data. If classification indicia are needed, the method checks the title in the computer accessible memory for previously obtained and stored classification information in the memory. If the information is not available in the memory, the method transfers to functional block 72 where a query is sent to an external cataloging data source, such as, for example, the Online Computer Library Center (OCLC) at the Library of Congress which would provide a uniform response. The cataloging data is received in functional block 74 and stored in the computer memory for future use. The method then continues to functional block 76. If, in decision block 70, the method determines that the publication classification data is already stored in memory, the method transfers directly to functional block 76.

Figure 3C:
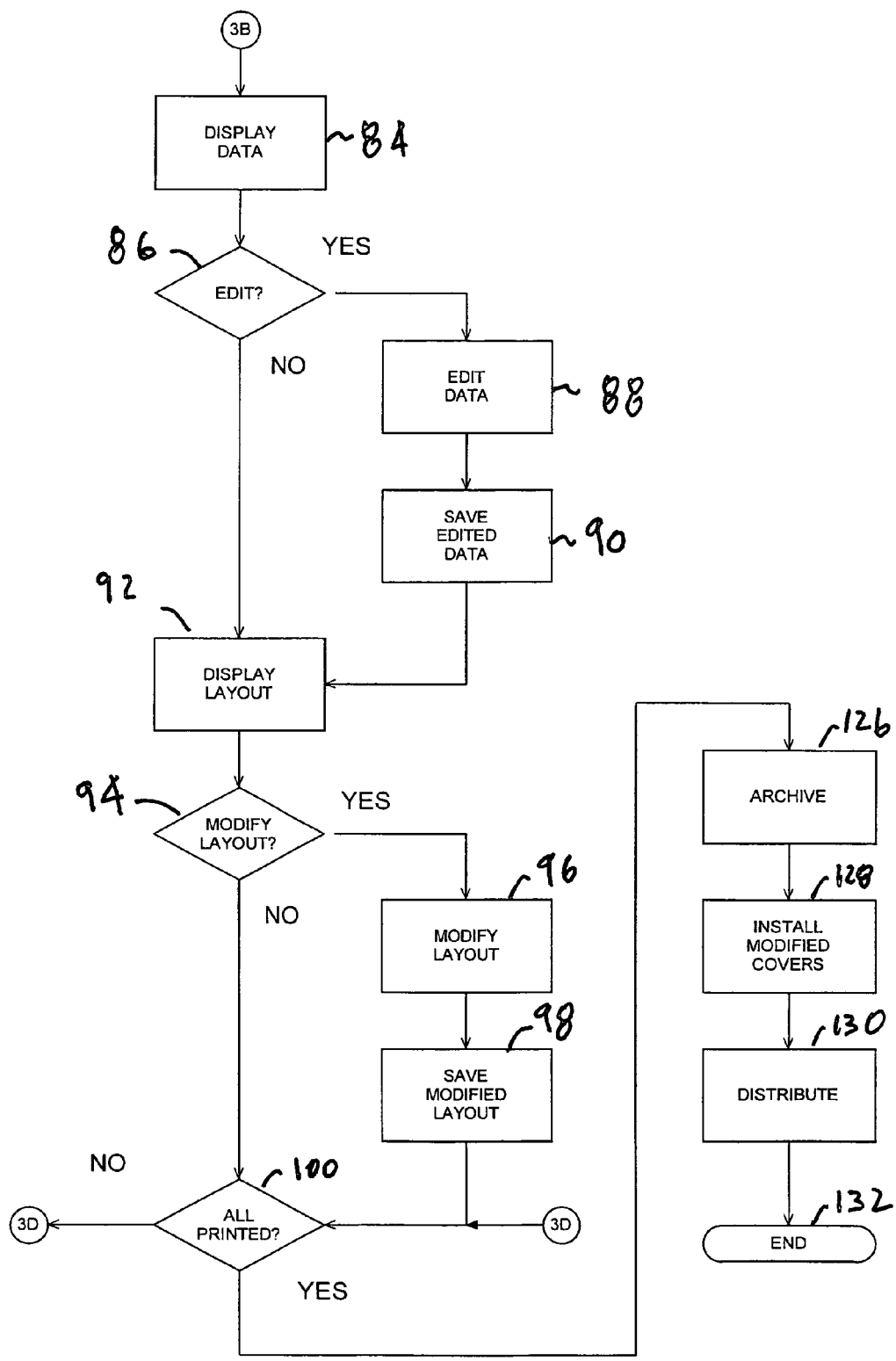

In functional block 76, a tracking slip is generated. For a centralized commercial service facility, the tracking slip would consist of a numbered invoice that would be generated in block 76. The method then advances to functional block 78 where the blending process shown in block 34 of FIG. 2 begins with creation of a temporary table for each title included in the order. The temporary table is based upon the template obtained from either the computer memory or generated in functional block 68. Continuing to functional block 80, a record, which is a row of data pertaining to a single title is added to the temporary table for each title of each publication ordered as per the information entered for the order in block 54. Then, in functional block 82, indicia are drawn from the accessible memory to fill any empty blocks that remain in the temporary table. Typical indicia may include, for example, publication title, library branch name, call number, etc. The method then advances to functional block 84, which is shown in FIG. 3C.

In functional block 84, the data to be included in the modified cover layout is displayed in textual data fields on a computer screen for review by the user. An example of a typical data field display is shown in FIG. 6. In FIG. 6, each row represents a single title while the columns represent lines of data. Thus, column 1 lists the publication title, column 2 lists the type of material, such as a DVD, column 3 identifies the name of the location where the material will be placed while columns 4 and 5 provide the address of the location. It will be appreciated, however, that the entries shown in FIG. 6 are meant to be exemplary and that the actual data amount and entries utilized may vary from what is shown in the figure. The invention contemplates that the user also has available the original packing sheet information and the associated cataloging data that may be pulled up and displayed upon a split screen for verification of the data fields. Once the user has reviewed the data fields, the method advances to decision block 86, where the operator is queried as to whether the data should be edited. If editing is needed, the method transfers to functional block 88 where the data in each displayed field may be modified by means of a conventional user interface, such as, for example, keyboard and/or mouse entries. The method then continues to functional block 90 where the modified data is inserted into the temporary table and saved in the computer memory. The method then advances to functional block 92. Returning to decision block 86, if it is determined that editing of the data is not needed, the method transfers to directly to decision block 92.

Figure 7:
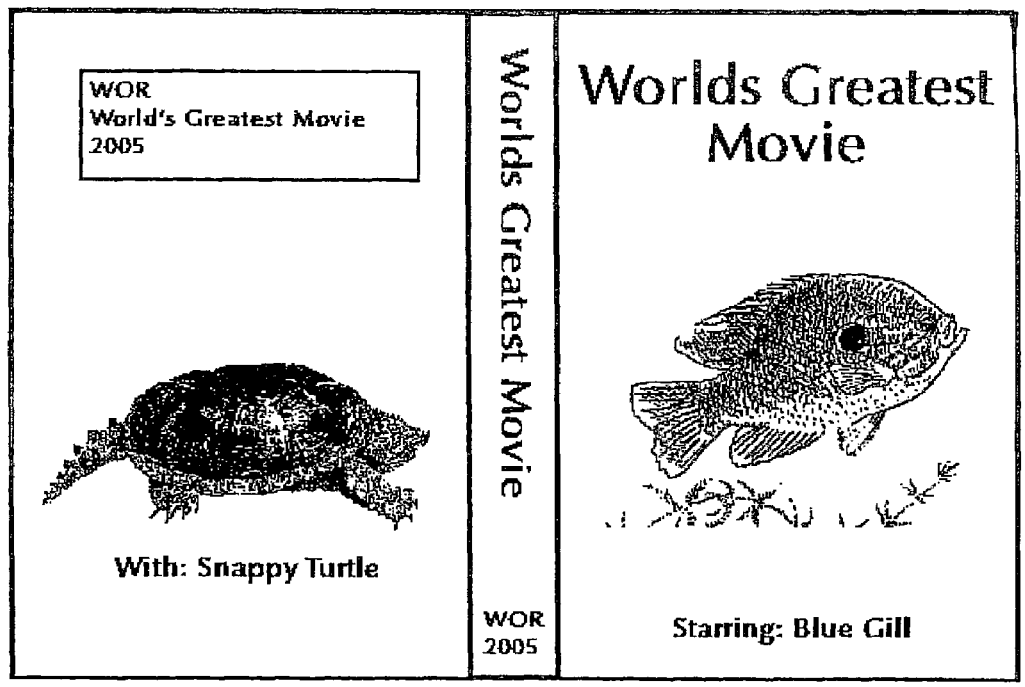
FIG. 7 is a computer monitor screen display of a typical cover layout used in the method illustrated in FIG. 3.
Figure 8:
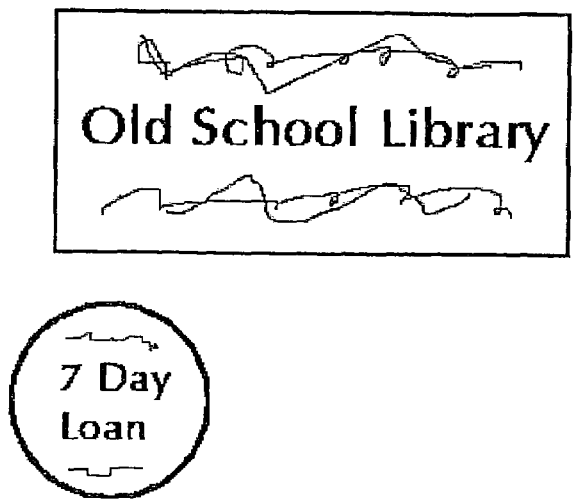
FIG. 8 illustrates typical images that may be added to the cover layout shown in FIG. 7.
Figure 9:
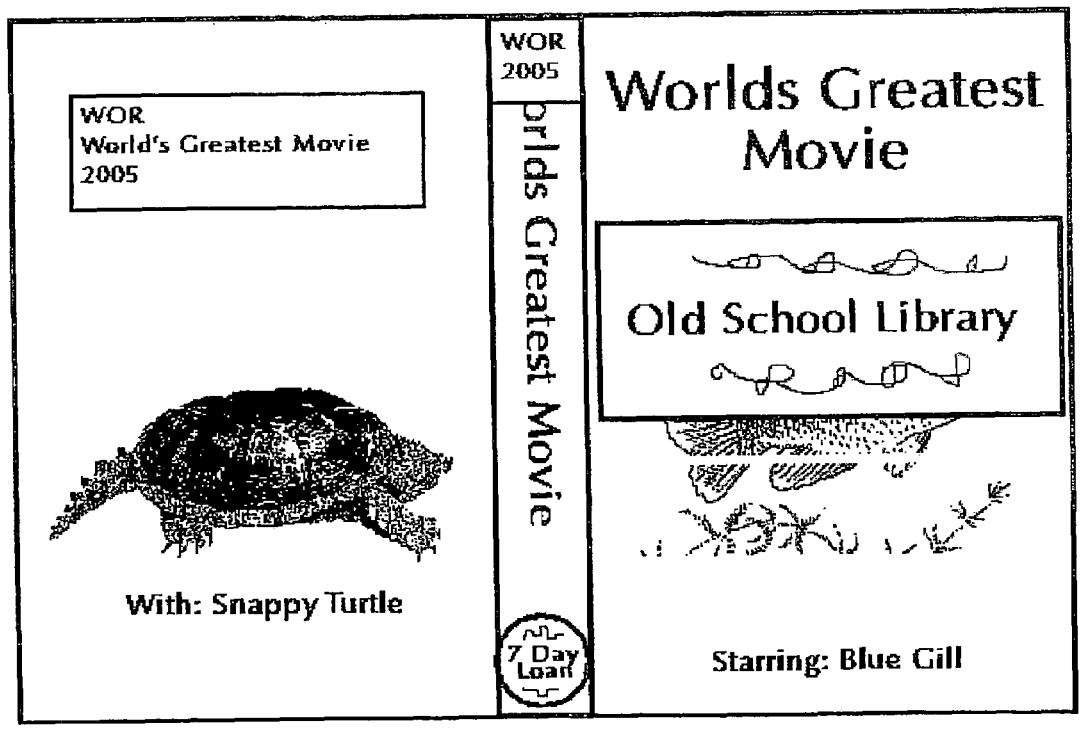
FIG. 9 is a computer monitor screen display of the cover layout shown in FIG. 7 with two labels added from FIG. 8.

In functional block 92, the current cover layout with the art work combined with the template configuration is displayed upon a computer screen to provide an interface for review and modification of the modified cover by the operator. A typical screen display of a modified DVD cover art work layout is shown in FIG. 7 where text boxes have been added to the cover art work shown in FIG. 4. The cover layout screen displays all text boxes and images based upon the display data contained in the temporary template table. The operator is then queried in decision block 94 as to whether the cover layout needs to modified. If modification is desired, the method transfers to decision block 96 where the operator is permitted to change the cover layout. Such changes may be implemented by means of the keyboard and/or the mouse. Included as possible changes are the addition of images, such as those shown in FIG. 8, to the cover layout. As the changes are implemented in functional block 96, they are shown on the computer screen for review by the operator. In the preferred embodiment, the screen is interactive, that is, the operator may use the mouse to move images about upon the cover art work. A further modified DVD cover that includes the labels illustrated in FIG. 8 is shown in FIG. 9. The changes are saved in functional block 98 and the method advances to decision block 100. If, in decision block 94, modification is not desired, the method transfers directly to decision block 100. The method also contemplates that the steps illustrated from block 84 through 98 are repeated, as needed, to modify the cover for each publication (not shown).

Figure 3D:
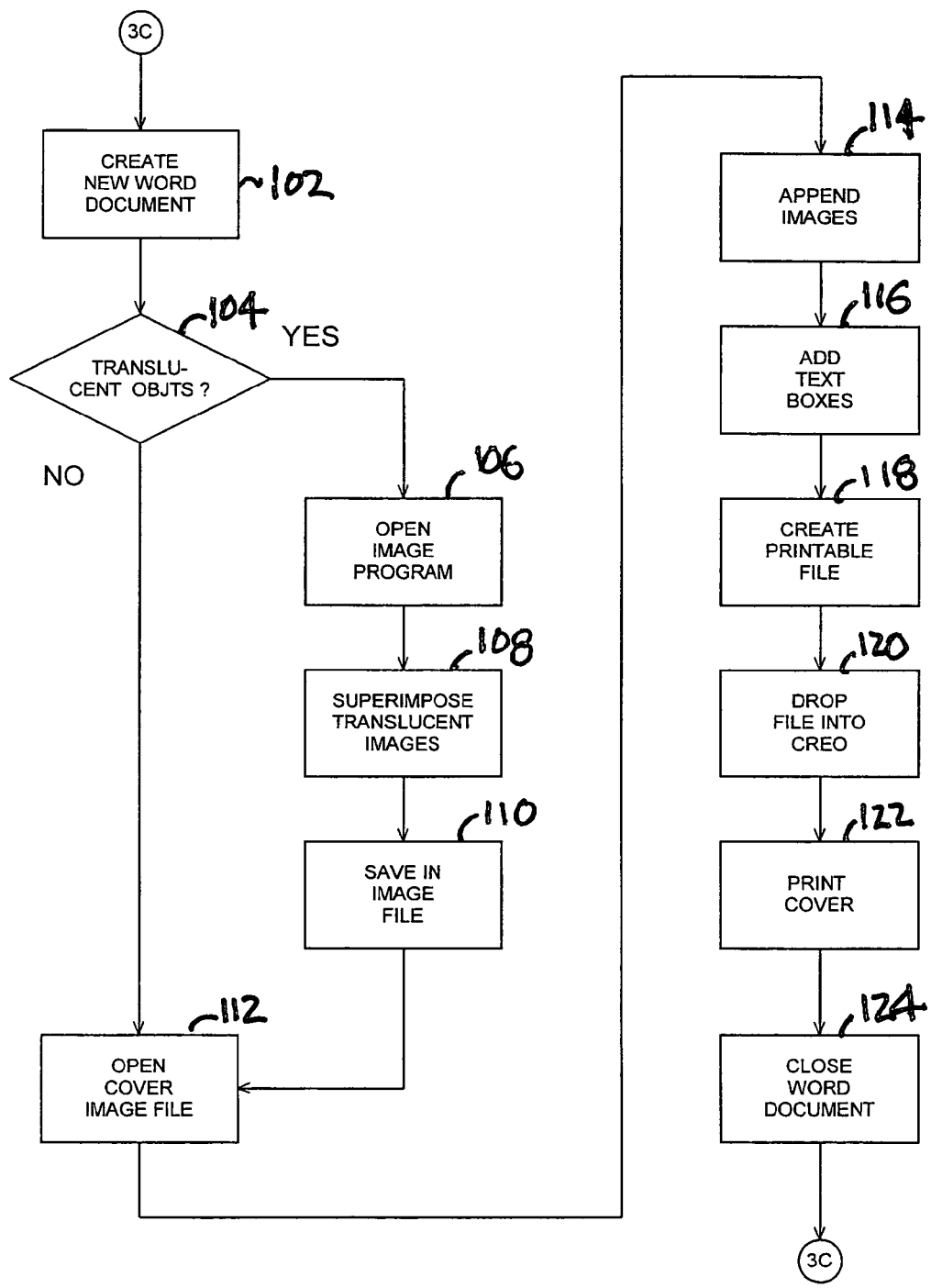
Figure 10:
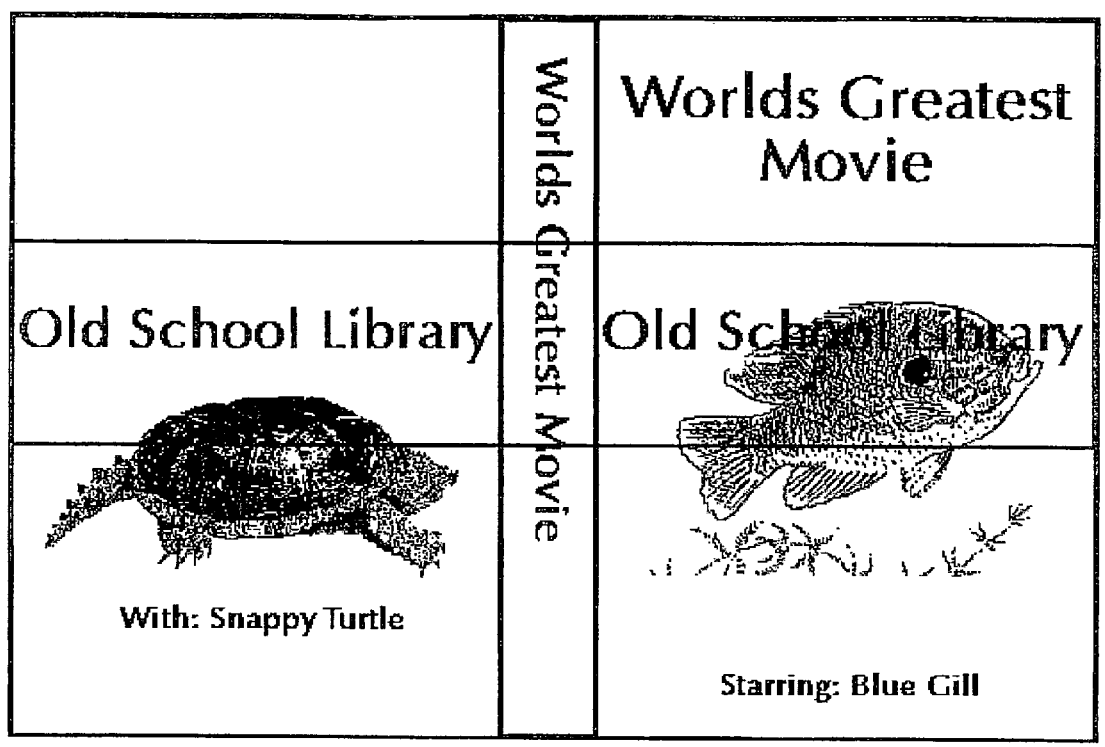
FIG. 10 is a computer monitor screen display of a cover layout generated by the method illustrated in FIG. 3 that includes translucent images.

In decision block 100, the method queries as to whether all of the ordered title covers have been printed. Upon the initial pass through the method, or if the printing is not completed, a transfer is made to the printing portion of the method that is illustrated in FIG. 3D. The printing portion sequentially processes each record generated for each title in the order, with one record being processed each time the printing portion is entered. In the preferred embodiment, the printing is controlled by the Microsoft Visual FoxPro program utilizing Windows® automation; however, the invention also contemplates that other commercially available publishing programs may be utilized. The printing portion is entered through functional block 102 where a new Microsoft Word document is created. The method then advances to decision block 104 where the user is queried as to whether or not the any translucent objects are to be included. Such translucent objects include labels that may be applied over the art work, but allow the art work to be viewed through the label. A typical translucent label placed upon a DVD cover is illustrated in FIG. 10, where a band that includes the name of the lending institution extends over the art work displayed on both the front and back portions of a DVD cover with the art work remaining visible through the band. If the user indicates that translucent objects are to be added, the method transfers to functional block 106 were translucent scanned cover images associated with the ordering party are opened in an image editing program. In the preferred embodiment, Adobe Photoshop® is utilized; however, the invention also may be practiced with other similar programs. The method then continues to functional block 108 where the user superimposes the selected translucent images onto the Photoshop® document by means of keyboard strokes and/or mouse operations. Again, as described above for functional block 96, in the preferred embodiment, the screen is interactive, that is, the operator may use the mouse to move the translucent images about upon the cover art work. The present invention also contemplates that such images may be obtained from the computer accessible memory or from other sources such as, for example, one of the computer drives or from an internet website. The modified Photoshop® document is saved as a new cover image file on the local computer hard drive in functional block 110 and the image editing program is closed. The method then continues to functional block 112. If, in decision block 104, there are no translucent objects to be added, the method transfers directly to functional block 112.

Upon reaching functional block 112, the interactive editing process of the cover by the user is completed. In functional block 112, the current cover digital image file in the Word document is opened to begin preparation of a printable document. The document preparation is carried out in the computer background and therefore the cover image is not accessible by the user during this portion of the method. Any additional images are appended as required by the customer template specification into the Word document in functional block 114. In functional block 116, text boxes are then added to the Word document and the text boxes are filled with indicia drawn from the temporary table in accordance with the customer template specification. The Word document is then printed into a conversion program to create an appropriate format for printing in functional block 118. In the preferred embodiment, Printable Document Format (PDF) is utilized and an Adobe Acrobat Distiller Program is utilized to convert the Word document into a PDF file; however, the invention also contemplates that other file formats and conversion programs also may be utilized. The method then advances to functional block 120 where the PDF file created in functional block 120 is transferred for printing. In the preferred embodiment, the PDF file is dropped into a hot folder in an image processing program. In the preferred embodiment, Spire CXP 5000, a program developed by Creo, a subsidiary of Kodak that specializes in imaging hardware and software, is utilized for processing the data in the PDF file prior to being sent to the printer. However, the invention also may be practiced with other image processing programs. The image processing program is operative to convert the formatted file into a printer readable file. A single cover for the particular record, or title, is then printed in functional block 122 and the Word document is closed in functional block 124. The method returns to decision block 100 on FIG. 3C to again check whether or not modified covers for all of the ordered records, or titles, have been printed.

Returning to decision block 100 in FIG. 3C, if the covers for all the records, or titles, included in the order have been printed, the method transfers to functional block 126 where the modified publication covers are archived in the computer accessible memory for potential future use. In the preferred embodiment, the data is archived in a Visual FoxPro® table; however, the invention also contemplates that other commercially available archiving programs may be utilized. The method then advances to functional block 128 where the original covers on the individual ordered items are replaced with the printed modified covers. For attached covers, such as for periodicals and soft cover books, the covers are either replaced or permanently attached over the original cover in functional block 128. For video tapes, the cover information, to include art work and data, is usually printed directly upon a video tape cassette storage box. Accordingly, as described above, the invention contemplates printing modified cover art work upon cardstock, or other suitable material, and then folding assembling the printed material into a replacement cassette storage box. The items are distributed to the ordering party in functional block 130 and the method ends in block 132.

By maintaining a data base of digital cover images, cataloging data and customer templates, the central processing facility can avoid much repetitive work when processing an order by drawing upon previously obtained material. Additionally, while the preferred embodiment has been described and illustrated in FIG. 3, it will be appreciated that FIG. 3 is intended to be exemplary and that the invention also may be practiced by other than shown above. For example, the modified cover image may be completed and archived after the required number of each of the modified covers printed from the archived file, rather than after all of the title covers have been printed, as shown in FIG. 3C. Similarly, each publication may processed separately, rather than as a batch as shown and described. For individual processing, the flow chart shown in FIG. 3C may transfer from decision block 100 to decision block 56 in FIG. 3A rather than to functional block 102 in FIG. 3D (not shown). Additionally, some of the steps shown in FIG. 3, such as, for example, the addition of translucent objects, may be omitted. Finally, the invention may practiced upon the art work for other materials than those specifically mentioned above, such as, for example the art work for video game cases.

Figure 11:
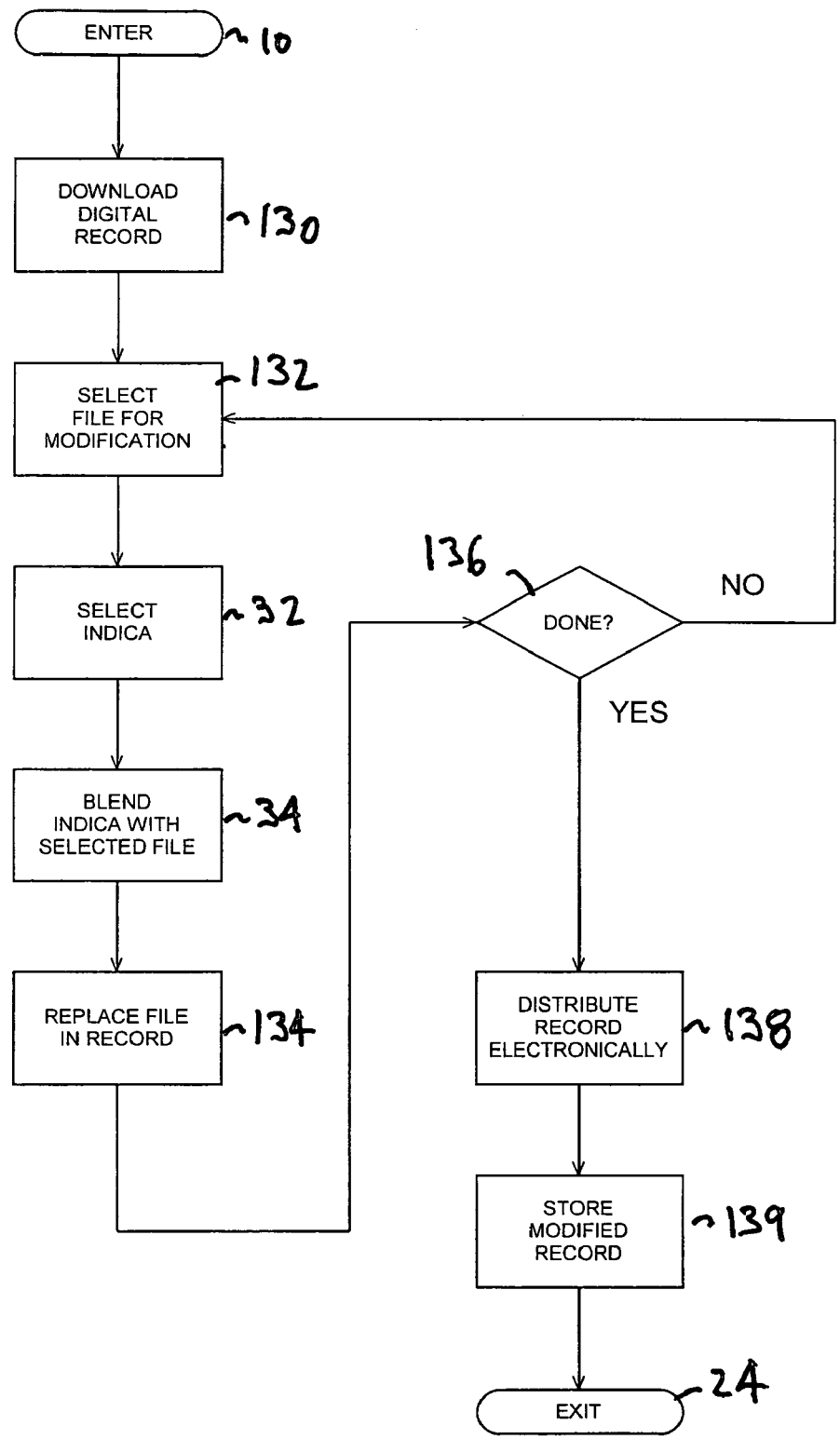
FIG. 11 is a flow chart illustrating an alternate embodiment of the invention shown in FIG. 2.

The invention also contemplates an alternate embodiment for publications in a digital medium that would be electronically transmitted between a publisher and a user. The alternate embodiment is illustrated by the flow chart shown in FIG. 11, where blocks that are similar to blocks shown in FIG. 2 have the same numerical identifiers. Thus, the method is entered through block 10 and proceeds to functional block 130 where a digital record of the publication is electronically downloaded directly from a source by any conventional method, such as, for example, over the internet. The digital record may be visual, such as a movie, audio, such as a sound track or music, still pictures, printed material or any combination of the aforementioned media forms. The record typically consists of files, to include a title page file, that would carry the cover art work and indicia identifying the particular publication or title, such as the title and author and, for CD's and DVD's, content notes. The method continues to functional block 132, where a particular file, such as the file containing data for the title page, or cover, is selected and withdrawn from the record. In the preferred embodiment, withdrawal consists of copying the data stored in the selected file. Because the selected file is already in digital format, the scanning step previously described and illustrated by functional block 64 in FIG. 3A is not needed. Continuing to functional block 32, the particular indicia that are to be added to the cover file are selected and then, in functional block 34, the selected indicia are digitally overlaid upon, or blended with, the selected file to form a modified selected file. The invention contemplates that the indicia may be moved to any position upon the image contained within the selected file. Additionally, individual indicia may be modified after they are overlaid upon the selected file image. The method then continues to functional block 134 where the modified selected file is replaced in the record. In the preferred embodiment, replacement consists of writing over the selected file content. Then the method advances to decision block 136.

In decision block 136, it is determined whether additional files in the record need to be modified, such as, for example, an index file that lists the content of the record. If additional files need to be modified, the method returns to functional block 132 and the next file is removed from the record for modification and the method continues as described above. If, in decision block 136, it is determined that modification of files is completed, the method will transfer to functional block 138 where the record with modified files is distributed to the customers by any conventional method, such as, for example, over the internet. Next the method continues to functional block 139 where the modified record is stored for use in future use and the method then exits through block 24. While the record is shown being stored in functional block 139, the invention alternately contemplates storing only the modified files from within the record. The alternate storage choice would reduce memory storage size requirements.

It will be appreciated that the detailed flow charts shown in FIGS. 3A through 3D may be easily modified for the alternate embodiment by replacing the functional blocks representing receipt and delivery with downloading of digital content. Similarly, any blocks involving printing a hard copy cover would be omitted. Such a modification is illustrated in FIGS. 12 A through 12D, where blocks that are similar to blocks shown in FIGS. 3A through 3D and FIG. 11 have the same numerical identifiers. Thus, upon reaching functional block 140, the publication is ordered electronically. While one publication is shown being ordered, it will be appreciated that multiple publications may be ordered with the method being repeated for each publication. Advancing to functional block 130, the digital record for the ordered publication is received electronically and the file to be modified is selected from the digital record in functional block 132. Again, while a single file is shown being selected in block 132, the invention also contemplates selecting multiple files from within the record for modification.

Figure 12A:
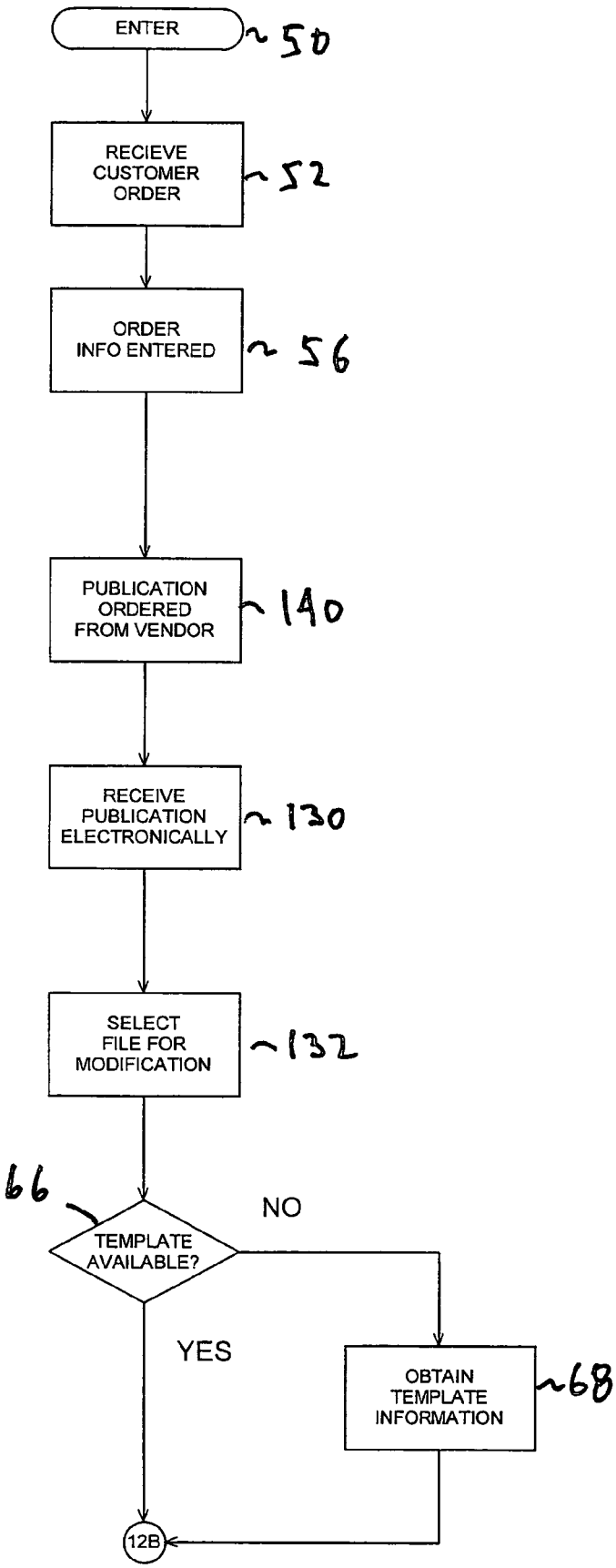
FIG. 12 is an expanded flow chart for the method shown in FIG. 11.
Figure 12B:
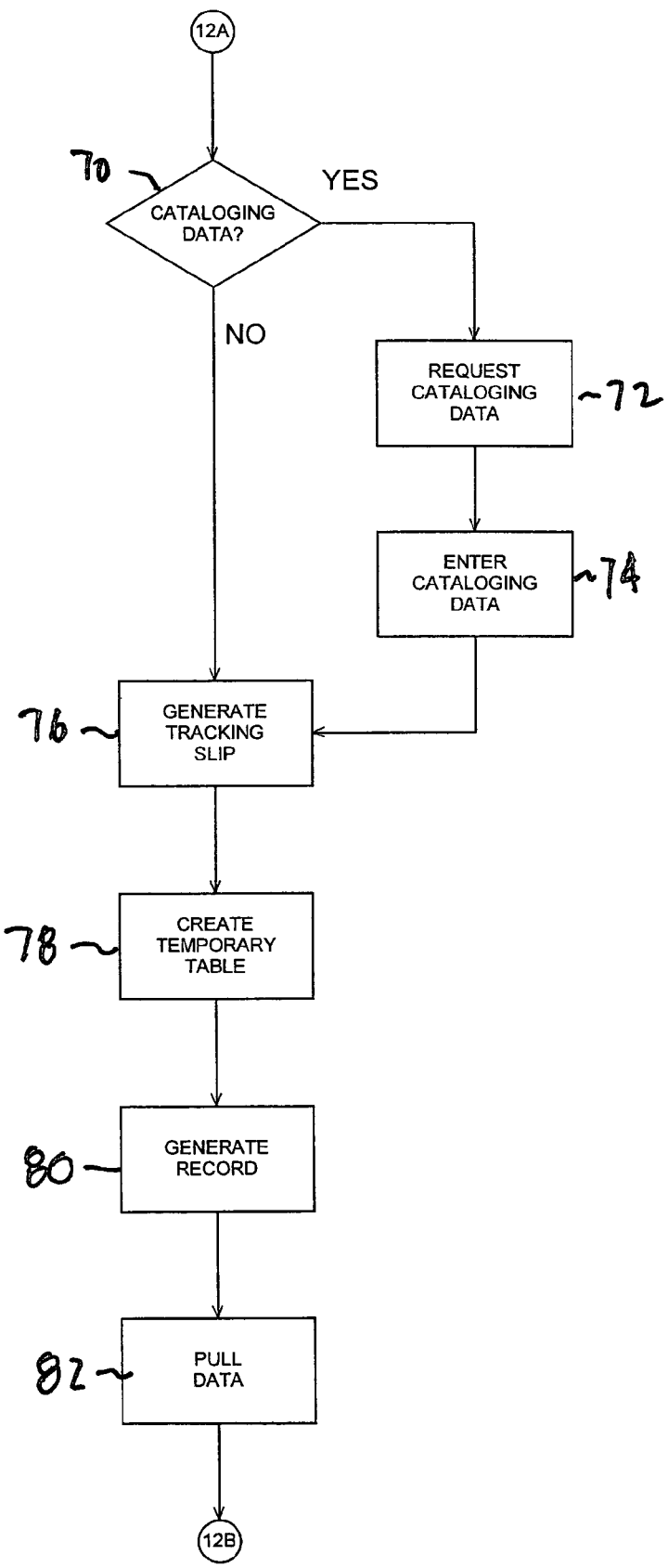
Figure 12C:
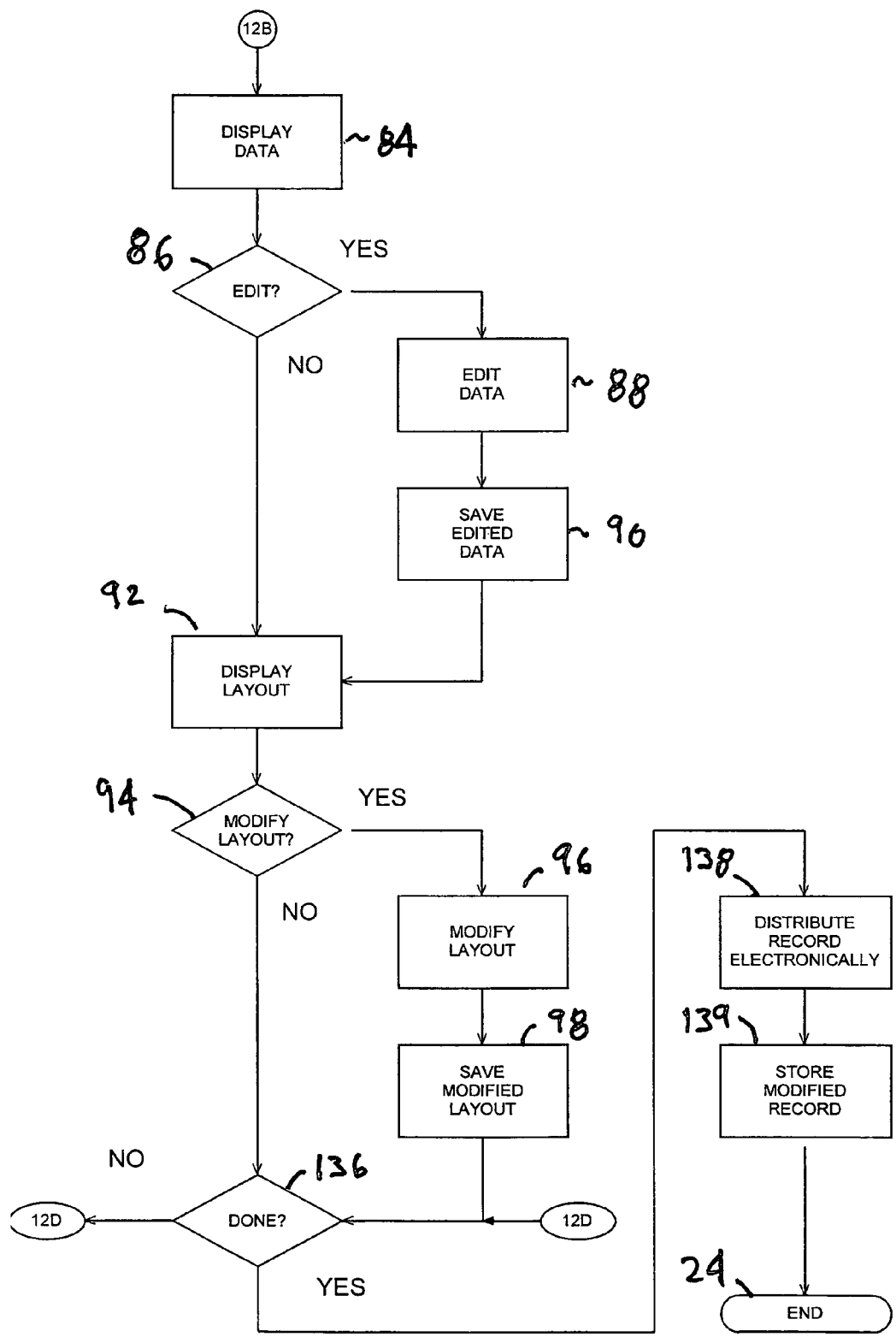

The method then continues as described above, until decision block 136 is reached in FIG. 12C where the method determines whether all of the files selected have been modified. If all of the files have been modified, the method transfers to functional block 138 where the record is distributed electronically and then archived for possible future use in functional block 139. The method then exits through block 24. If there are multiple publications included in the order, another decision block (not shown) may be added between decision block 136 and functional block 138 to return to the beginning to modify files in the other publications.

Figure 12D:
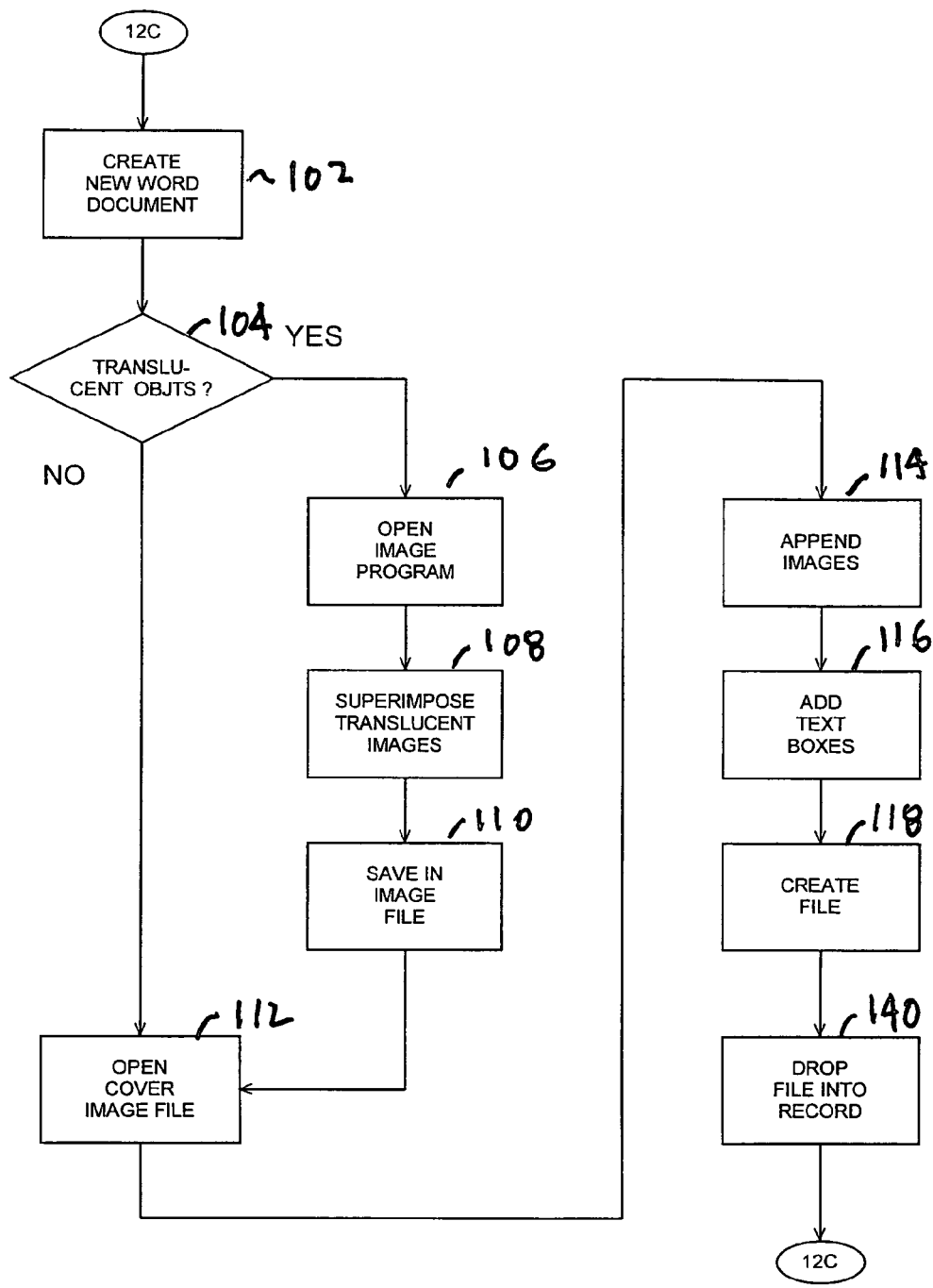

Upon the initial pass though the method, or if all of the selected files have not been modified in decision block 136, the method transfers to the steps shown in FIG. 12D, which are similar to the steps shown in FIG. 3D, except that the modified file is not printed, but placed into the record in functional block 140.

Again, while the preferred embodiment has been described and illustrated in FIG. 12, it will be appreciated that FIG. 12 is intended to be exemplary and that the invention also may be practiced by other than shown above. Also, while the method for electronic distribution has been described and illustrated in FIG. 12, it will appreciated that the method also may be combined with the hard copy method of FIG. 3 by adding decision blocks (not shown) to query whether the publication is in a digital or hard copy format. The decision reached would then direct the method to the specific steps shown for the identified format as shown in FIGS. 3 and 12.

While the preferred embodiments have been described for modification of covers in either hard copy or digital format, it will be appreciated that the invention also may be practiced by combining the two forms of format. Thus, the method also contemplates converting a publication from a hard copy, such as a printed book, into a digital record, and modifying selected files within the digital record, such as the cover file. The modified records would be reinserted into the record and the modified record electronically distributed to the customer. Similarly, the method contemplates electronically receiving a digital record of a publication and modifying selected files within the digital record, such as the cover file. The modified records would be reinserted into the record and the modified record used to print a hard copy of the publication. The hard copy would then be distributed to the customer.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. Thus, for example, while the method is described as including a hold in functional block 60 until ordered titles are received and placed in inventory, the invention also may be practiced by continuing to process titles that are covered by inventory while the needed copies are on order to provide a partial shipment of titles to the customer. Also, as mentioned above, while the preferred embodiment has been illustrated and described as providing a record for each title ordered for each publication with each resulting record processed sequentially, the invention also may be practiced by processing each publication with associated titles sequentially.

What is claimed is:

1. A method for preparing a cover for a title comprising the steps of:
    (a) receiving a title having a cover from a supplier at a central service facility that is located separately from the supplier;
    (b) scanning the cover of the title at the central service facility under the control of a computer to generate a scanned image of the cover;
    (c) generating a modified scanned cover image under the control of the computer by modifying the scanned cover image to include indicia related to another location that is located separately from the central service facility and the supplier;
    (d) printing a modified cover from the modified scanned cover image under the control of a computer;

(e) installing the modified cover upon the title; and (f) forwarding the title with the modified cover to the other location.

2. The method according to claim 1 wherein step (c) includes modifying the scanned cover image in accordance with a stored template generated at the central service facility that includes the indicia for the other location that is located separately from the central service facility and the supplier, the template being stored in a digital data storage device.

3. The method according to claim 2 wherein, during step (c), the modified scanned cover image is displayed upon a computer screen and an interface is provided with which a user may modify the cover image displayed upon the computer screen at any time prior to printing the modified cover in step (d).

4. The method according to claim 3 wherein the interface includes at least one of a computer keyboard and a mouse.

5. The method according to claim 3 wherein the method also includes, prior to step (e), checking an inventory of titles to determine if a sufficient number of copies are available and further wherein, if it is determined that an insufficient number of copies are available, ordering additional copies of the titles.

6. The method according to claim 5 further including, prior to step (a), receiving an order for the title at the central service facility from the other location and then checking a computer memory to determine whether a template for modifying the scanned title cover image in accordance with the particular other location is in the computer memory.

7. The method according to claim 6 further including, upon determining that indicia are missing from the template, contacting an external cataloging data source for the missing indicia.

8. The method according to claim 7 further including storing the missing indicia in the computer memory.

9. The method according to claim 6 further including, upon determining that a template is not available for the other location, creating a template for the other location that includes indicia specifically related to the other location.

10. The method according to claim 1 further including after step (b), but before step (c), storing the scanned image.

11. A method for modifying a digital record comprising the steps of:

(a) downloading a digital record from a first location at a second location, the digital record including a plurality of digital files;

(b) selecting a digital file from within the digital record;

(c) withdrawing the selected digital file from the record;

(d) selecting desired indicia related to a third location;

(e) digitally overlaying the selected desired indicia upon the withdrawn digital file to generate a modified digital file;

(f) writing over the selected digital file in the digital record with the modified digital file; and (g) distributing the digital record with the overlain digital record to the third location.

12. The method according to claim 11 further including, after step (e), storing the modified digital file in a digital storage device.

13. The method according to claim 12 wherein step (e) includes overlaying the selected digital file in accordance with a template generated at the second location and stored in a digital data storage device.

14. The method according to claim 13 wherein the template is associated with a specific customer.

15. The method according to claim 14 wherein, during step (e), the selected digital file is displayed upon a computer screen and an interface is provided with which a user may overlay the selected desired indicia upon the displayed digital file.

16. The method according to claim 15 wherein the interface includes a computer keyboard and a mouse.

17. The method according to claim 16 further including, prior to step (a), receiving an order for the digital record from the third location and then checking a computer memory to determine whether a template for the third location is in the computer memory.

18. The method according to claim 17 further including, upon determining that indicia are missing from the template, contacting a source for missing indicia and then adding the indicia received from the source to the template with the interface.

19. A method for preparing a cover for a publication comprising the steps of:

(a) receiving at least one publication having a cover from a publisher at a central service facility that is located separately from the publisher;

(b) scanning the cover of the publication at the central service facility under the control of a computer to generate a scanned image of the cover;

(c) generating a modified scanned cover image under the control of the computer by modifying the scanned cover image to include indicia related to a library that is located separately from the central service facility;

(d) printing a modified cover from the modified scanned cover image under the control of a computer;

(e) installing the modified cover upon the publication; and (f) forwarding the publication with the modified cover to the library.

20. The method according to claim 19 wherein during step (a) a plurality of a specific publication are received and further wherein a plurality of modified covers are generated in step (c) that include indicia related to several libraries, the modified covers being installed in step (e) and the publications with the installed covers being forwarded to the specific libraries associated with the indicia include on the modified cover during step (f).

* * * * *

UNITED STATES PATENT AND TRADEMARK OFFICE
CERTIFICATE OF CORRECTION

| | |
|---|---|
| PATENT NO. | : 7,667,863 B1 |
| APPLICATION NO. | : 11/259915 |
| DATED | : February 23, 2010 |
| INVENTOR(S) | : Eldred et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 911 days.

Signed and Sealed this

Seventh Day of December, 2010

David J. Kappos
*Director of the United States Patent and Trademark Office*